Oct. 20, 1931.  E. O. SHREFFLER  1,828,451
AUTOMOBILE FENDER
Filed Aug. 16, 1929  2 Sheets-Sheet 1
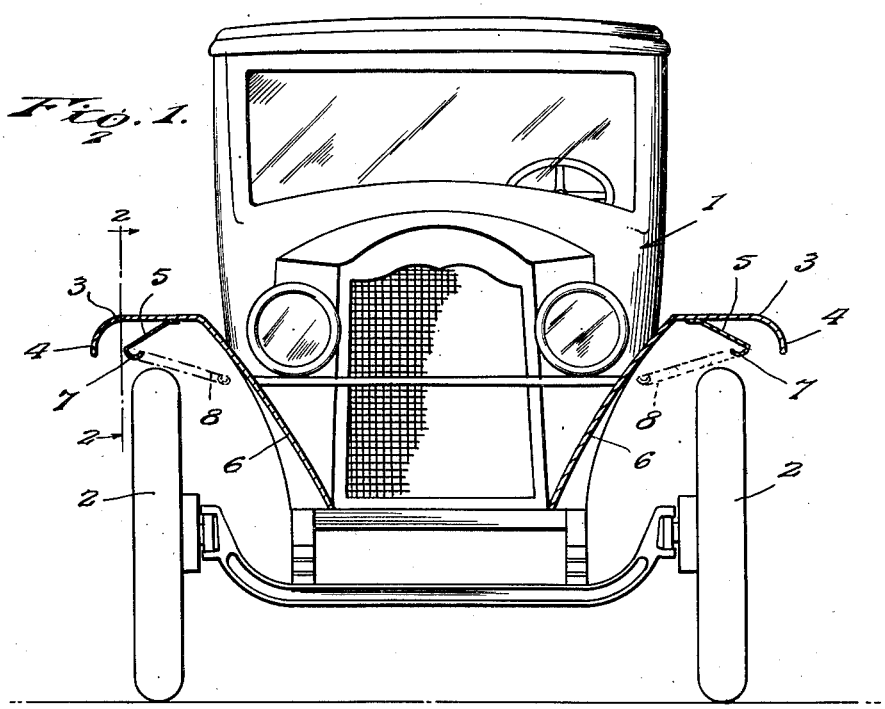
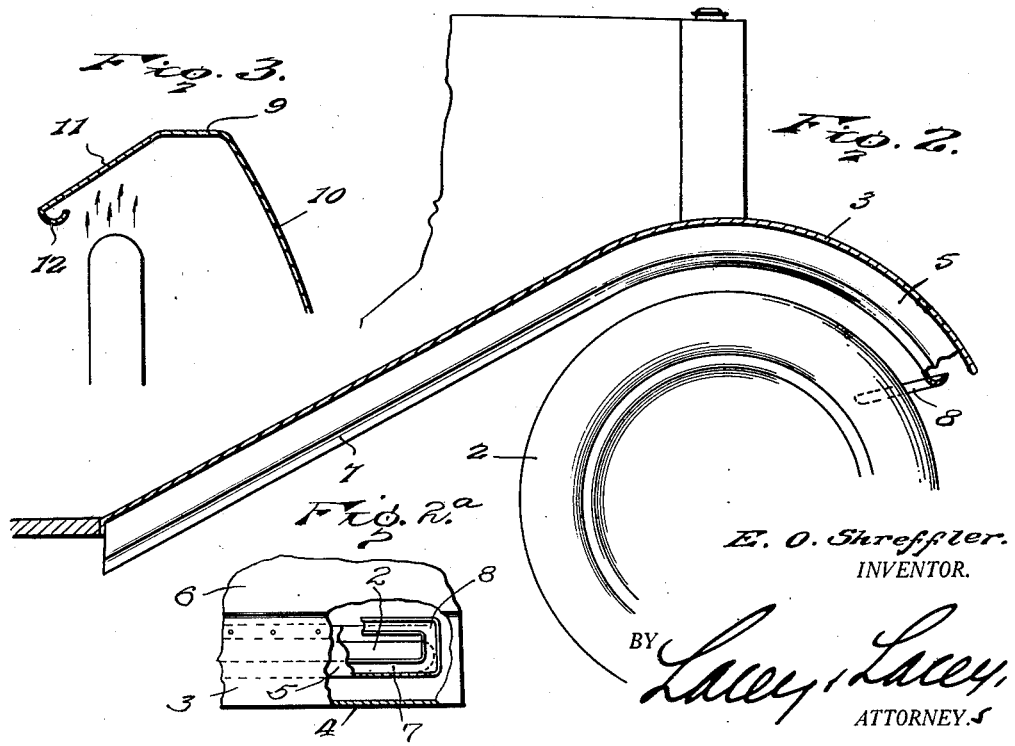
E. O. Shreffler.
INVENTOR.
BY Lacey & Lacey
ATTORNEYS Oct. 20, 1931.  E. O. SHREFFLER  1,828,451
AUTOMOBILE FENDER
Filed Aug. 16, 1929   2 Sheets-Sheet 2
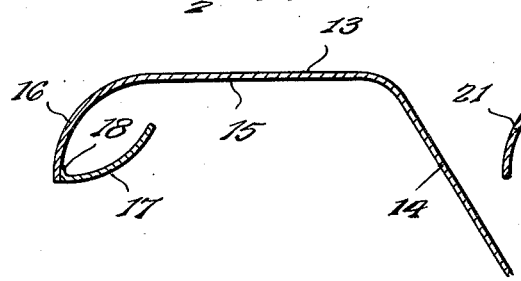
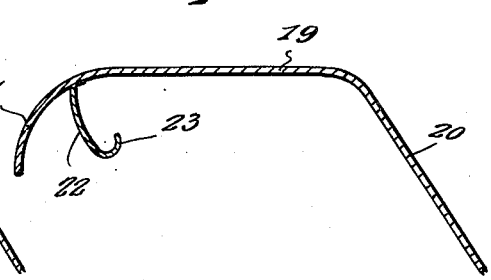
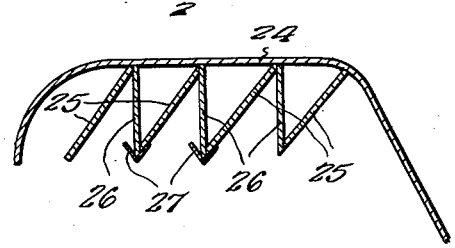
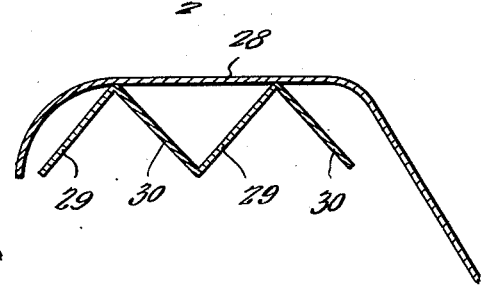
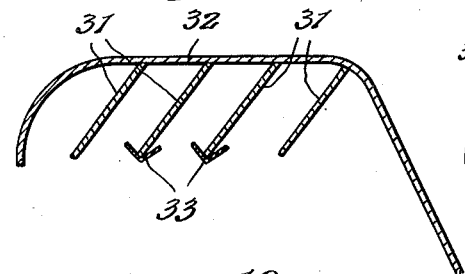
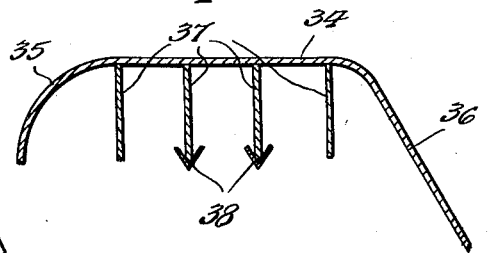
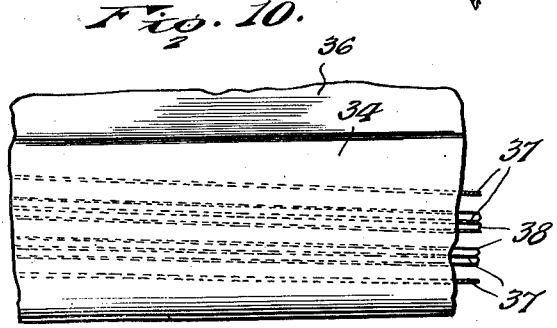
E. O. Shreffler.
INVENTOR.
BY
ATTORNEYS Patented Oct. 20, 1931

1,828,451

UNITED STATES PATENT OFFICE

ELWYNE O. SHREFFLER, OF MANTENO, ILLINOIS

AUTOMOBILE FENDER

Application filed August 16, 1929. Serial No. 386,414.

This invention relates to vehicles and more particularly to an improved mud guard or fender. At the present time it is customary to provide an automobile with mud guards or fenders extending outwardly from the sides of the body portion over the wheels in order to prevent the automobile or its occupants from being splashed by mud or dirty water and while the guard or fenders now in use have been found efficient to a certain extent, they do not adequately protect the automobile as water and soft mud thrown upwardly from the wheels during wet weather or when traveling over muddy roads strike the portions of the mud guards extending over the wheels at substantially right angles thereto and the water and soft mud is splashed outwardly as well as inwardly and the portion splashed outwardly moves across the under face of the mud guard until it reaches the down turned outer side edge portion. This water and soft mud when it reaches the outer side edge of the mud guard either drips downwardly from it or flows along it and draft caused by the momentum of a forwardly moving automobile when traveling at a high rate of speed or even at a relatively slow rate of speed, will cause the water and mud to be blown rearwardly from the outer side edges of the mud guard. This water and mud splashes against the sides of the body of the automobile and if the automobile is a touring car or other car of the open type the mud and water is liable to be thrown into the car and soil the upholstery and clothing of the occupants of the car.

It is, therefore, one object of the invention to provide an automobile with fenders so constructed that mud and water thrown upwardly by the front wheels toward the fenders disposed in shielding relation thereto will be prevented from reaching the outer side edges of the fenders and thereby prevented from being blown rearwardly onto or into the body portion of the automobile.

Another object is to allow the inventive idea to be carried out either by initially shaping the fenders so as to accomplish the desired object or by providing deflecting strips or baffles which may be secured against the under faces of fenders of a conventional construction and cause the mud and water to be deflected toward the skirts at the inner sides of the fenders when thrown upwardly by the wheels of the automobile.

Another object of the invention is to provide the automobile fenders with mud and water deflecting attachments which will not only serve this purpose but also serve to brace and reinforce the fenders.

The invention is illustrated in the accompanying drawings, wherein:

Figure 1 is a view showing an automobile principally in front elevation and having its front fenders shown in transverse section and equipped with mud and water deflectors in accordance with this invention.

Figure 2 is a view in side elevation showing a fender having a deflector applied thereto, the fender being shown in section along the line 2—2 of Figure 1.

Figure 2ª is a top plan view of one of the fenders with portions broken away.

Figure 3 is a transverse sectional view through a fender shaped in cross section to provide a deflecting surface.

Figure 4 is a view similar to Figure 3, showing a modified construction.

Figure 5 is a transverse sectional view through a fender having a modified form of deflector applied thereto.

Figure 6 is a transverse sectional view through a fender having another form of deflecting means applied to its under surface.

Figure 7 is a view similar to Figure 6, showing deflecting means somewhat similar to that shown in Figure 6, but of a modified construction.

Figure 8 is a transverse sectional view through a fender having another modified form of deflecting strip applied thereto.

Figure 9 is a view similar to Figure 8, showing another form of deflecting means applied to a fender.

Figure 10 is a top plan view of a portion of a fender equipped with the deflectors shown in Figure 9.

The automobile shown in Figure 1, in front elevation, and indicated in general by the numeral 1, represents a conventional type of automobile, the front wheels being indicated by the numeral 2 and the fenders by the numeral 3. These fenders are of a conventional construction and have their outer side portions 4 turned downwardly. While the down turned side portions 4 of the fenders serve to a certain extent to prevent mud and water from splashing outwardly, it has been found in actual practice, that the mud and water flow downwardly along the inner surfaces of the down turned side portions and drip from the edges thereof. This mud and water which drips from the outer side edges of the fenders and often flows in a stream along the side edges during wet weather or when moving along muddy roads, is blown rearwardly by draft caused by the momentum of the automobile and will cause the sides of the automobile body to be splashed with mud and dirty water and often flies into the automobile if it is of the open type and soils the upholstery of the car and clothing of the occupants.

In order to overcome the objections noted above and prevent the mud and water from soiling the sides of the automobile body, the fenders shown in Figures 1 and 2 have been provided with baffle strips 5 which extend longitudinally of the fenders, as shown in Figure 2, and are secured against the under surfaces thereof either by rivets passed through the inner side edge portions of the baffle strips or in any other desired manner. These strips or sheets 5 extend at a downward incline transversely of the fenders toward the outer side edges thereof, as shown in Figure 1, and from an inspection of Figure 1, it will be readily seen that mud and water thrown upwardly from the front wheels will strike the under faces of the strips instead of striking against the under surfaces of the fenders. It will also be noted that the mud and water will strike the under surfaces of the baffle strips diagonally thereof and will be deflected inwardly toward the skirts 6 of the fenders. Therefore, the mud and water will be prevented from splashing toward the outer side edges of the fenders and prevented from dripping off of the outer side edges of the fenders and being blown rearwardly against the sides of the automobile body. The outer side edge portions of the deflecting strips have been shown bent inwardly to form gutters 7 which will serve very effectively to catch any water which gravitates toward the outer side edges thereof and as these gutters extend the full length of the baffle strips, as shown in Figure 2, this water will drop upon the ground beneath the foot board of the automobile in spaced relation to its outer side edge and there will be no danger of this water being blown rearwardly against the sides of the automobile body. At the forward ends of the deflecting strips, the gutters are extended as shown at 8, and curved rearwardly so that they extend between the front wheels and the skirts of the mud guards or fenders. Therefore, any water and soft mud which flows downwardly toward the forward ends of the strips 5 will be caught in the extended gutters and prevented from blowing outwardly.

In Figure 3, there has been shown a modified construction wherein the deflecting means is formed integral with the fenders while making the same instead of as a separate element to be applied to a fender of a conventional construction. In this form of the invention the mud guard, which is indicated in general by the numeral 9, is provided with the usual skirt 10 but instead of extending horizontally for substantially the full width from the skirt and terminating in a down turned outer side portion, as shown in Figure 1, this fender only extends in a horizontal direction for a short distance and is then bent to form a portion 11 which is flat throughout its width and disposed diagonally above the automobile wheel over which it extends. This portion 11 takes the place of the deflecting strip 5 and mud and water thrown against it will be deflected inwardly toward the skirt 10 of the fender and be prevented from dripping from the outer side edge of the fender and blowing rearwardly against the body of the automobile. In case any water should gravitate toward the outer side edge of the fenders, there has been provided a gutter 12 corresponding to the gutter 7 and serving to lead the water rearwardly along the fender so that it will drop upon the ground beneath the step of the automobile.

In Figure 4, there has been shown another modified form of the invention in which the means for preventing the body portion of the automobile from being splashed with mud and water may be formed integral with the fender or as an attachment to be applied to the fender. Referring to this figure, it will be seen that the fender 13 closely resembles a fender of a conventional construction and includes the usual skirt 14 and outwardly projecting portion 15 which extends from the upper portion of the skirt and terminates in a downwardly curved outer side portion 16. A strip 17 which extends the full length of the fender, projects inwardly along its outer side edge and this strip, which is curved transversely so that it projects upwardly, may either be formed integral with the fender or have its outer side edge portion formed with an attaching flange 18 welded or otherwise firmly secured along the outer side edge of the fender. This strip forms a relatively wide and deep gutter so that water and soft mud flowing toward the outer side of the fender will be caught and led rearwardly and it should also be noted that if mud and water should strike the under surface of this gutter it will be deflected inwardly and prevented from splashing outwardly beyond the fender.

In Figure 5, the fender 19 is similar in construction to the fender shown in Figure 4, and is formed with a skirt 20 and downwardly curved outer side portion 21 corresponding to those shown in Figure 4. Instead of providing this fender with a strip or mud and water guard secured along the outer side edge of the fender, as shown in Figure 4, there has been provided a strip 22 which extends longitudinally beneath the fender in a substantially upright position and has its upper edge secured against the fender in any desired manner. This strip or sheet 22 is curved transversely so that it extends inwardly and preferably has its lower edge portion bent upwardly, as shown at 23, to form a gutter. This strip will serve very effectively to prevent water and soft mud from reaching the outer side edge of the fender as the mud and water splashed outwardly when striking the under surface of the fender will strike against the inner side face of this strip and either drop downwardly onto the ground well within the lines of the outer side edge of the fender or be caught in the gutter along which it will flow until it drops upon the ground beneath the step of the automobile.

In Figure 6, the fender, indicated by the numeral 24, is of a conventional construction and in order to cause water and mud to be deflected inwardly, there has been provided strips 25 which project downwardly from the under surface of the fender at an outward incline. By this arangement, water and soft mud thrown upwardly by a wheel and striking the strips 25 will be deflected inwardly. Between the strips 25 extend other strips 26 which are disposed vertically and these strips 26 may be formed separate from the strips 25 and suitably joined thereto or the strips 25 and 26 may be formed from a single sheet of metal crimped to define these strips. Gutters 27 may be provided along the intersecting lower edge portions of the strips 25 and 26 or omitted if so desired.

In Figure 7, there has been disclosed still another modified form of the invention. The mud guard or fender 28 shown in this figure, is of a conventional construction similar to the fender 24 shown in Figure 6, and in order to prevent mud and water from splashing outwardly there has been provided deflecting means consisting of a wide strip of sheet metal crimped longitudinally to form sections or surfaces 29 corresponding to the strips 25 and other sections or surfaces 30 corresponding to the sections or strips 26 but disposed diagonally instead of vertically. When this form of the invention is employed, mud and water striking the surfaces or sections 29 and 30 directly above the automobile wheels will be deflected and upon striking the sections which extend downwardly therefrom, will be caused to fall upon the ground beneath the fenders without splashing beyond the fenders, and also prevented from blowing to the outer side edge of the fender and dripping from the same.

The form of the invention illustrated in Figure 8, consists of a suitable number of deflecting strips 31 which extend longitudinally beneath the mud guard or fender 32 and extend downwardly therefrom at an outward incline similar to the manner in which the strips 25 are disposed. These strips will serve very effectively to deflect mud and water toward the inner sides of the mud guard and gutters 33 may be provided along the lower edges of the strips 31 to catch water flowing downwardly along the same and lead the water rearwardly beneath the step of the automobile or the gutters may be omitted.

In Figures 9 and 10, there has been shown a fender or mud guard 34 of a conventional construction having the usual down turned outer side portion 35 and skirt 36. Strips 37, which are disposed vertically, extend longitudinally of the fender and are secured against the under surface thereof in any desired manner. These strips extend diagonally along the fender toward the inner side portion thereof, as shown in Figure 10, and mud and water flowing toward their lower edges after striking the fender and splashing upon the strips, will be directed toward the inner side of the fender and drop upon the ground without having an opportunity to flow rearwardly and splash the body of the automobile. Gutters 38 may be provided along the lower edges of the strips to catch water and lead it rearwardly or these gutters may be omitted.

What is claimed is:

1. A fender for a vehicle wheel, a strip extending longitudinally of said fender beneath the same and adapted to deflect material thrown upwardly from a wheel away from the outer side edge of the fender, and a gutter extending from the forward end of said strip toward the inner side of the fender and having its free end portion bent rearwardly to extend between the fender and a wheel.

2. A fender for a vehicle wheel a strip extending longitudinally of said fender against the under surface thereof in depending relation to the fender and adapted to deflect material thrown upwardly from a wheel away from the outer side edge of the fender, and a gutter extending from the forward end of said strip toward the inner side of the fender.

3. A fender for a vehicle wheel, and a strip extending longitudinally of said fender against the under surface thereof in depending relation to the fender and provided with a gutter along its free side edge, the gutter having its forward end portion extending from the strip transversely thereof towards the inner side of the fender.

4. A fender for a vehicle wheel, a strip extending longitudinally of said fender against the under surface thereof and sloping downwardly toward the outer side edge of the fender and having its free side edge portion bent inwardly and upwardly to form a gutter, and an auxiliary gutter extending from the forward end of said strip towards the inner side of the fender and bent to extend rearwardly between the fender and a wheel.

In testimony whereof I affix my signature.

ELWYNE O. SHREFFLER. [L. s.]